United States Patent
Bauer

(10) Patent No.: US 7,433,461 B1
(45) Date of Patent: Oct. 7, 2008

(54) METHOD FOR GENERATING A DIALING DIRECTORY IN A NETWORK TERMINAL AND COMMUNICATIONS NETWORK FOR SUCH A METHOD

(75) Inventor: Josef Bauer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 365 days.

(21) Appl. No.: 10/148,069

(22) PCT Filed: Nov. 9, 2000

(86) PCT No.: PCT/DE00/03918

§ 371 (c)(1),
(2), (4) Date: May 28, 2002

(87) PCT Pub. No.: WO01/39517

PCT Pub. Date: May 31, 2001

(30) Foreign Application Priority Data

Nov. 25, 1999 (DE) ............................... 199 56 831

(51) Int. Cl.
*H04M 1/00* (2006.01)
*H04M 3/00* (2006.01)
(52) U.S. Cl. ........................... 379/355.02; 379/355.04
(58) Field of Classification Search ............... 379/67.1, 379/84, 88.03, 100.13, 100.14, 355.02, 355.04
See application file for complete search history.

(56) References Cited

U.S. PATENT DOCUMENTS

| | | | | |
|---|---|---|---|---|
| 5,764,731 A | * | 6/1998 | Yablon | 379/88.15 |
| 5,812,946 A | | 9/1998 | Nakabayashi et al. | |
| 6,049,594 A | * | 4/2000 | Furman et al. | 379/67.1 |

FOREIGN PATENT DOCUMENTS

| | | |
|---|---|---|
| DE | 197 28 696 A1 | 9/1998 |
| DE | 197 44 370 A1 | 4/1999 |
| EP | 0 178 111 A2 | 4/1986 |
| EP | 0 554 625 A1 | 8/1993 |
| EP | 0 855 822 A2 | 7/1998 |
| WO | WO 9602996 A1 | 2/1996 |
| WO | WO 99/45687 | 9/1999 |

OTHER PUBLICATIONS

Abstract of Japanese Publication No. 11252237A (corresponding to DE 197 44 370 A1).

* cited by examiner

*Primary Examiner*—Alexander Jamal
(74) *Attorney, Agent, or Firm*—Staas & Halsey LLP

(57) ABSTRACT

Connection data, for example, a telephone number, and a corresponding identification, for example, the name of the telephone subscriber associated with the corresponding telephone number, is automatically extracted from a data memory and saved in a dialing directory memory.

23 Claims, 1 Drawing Sheet

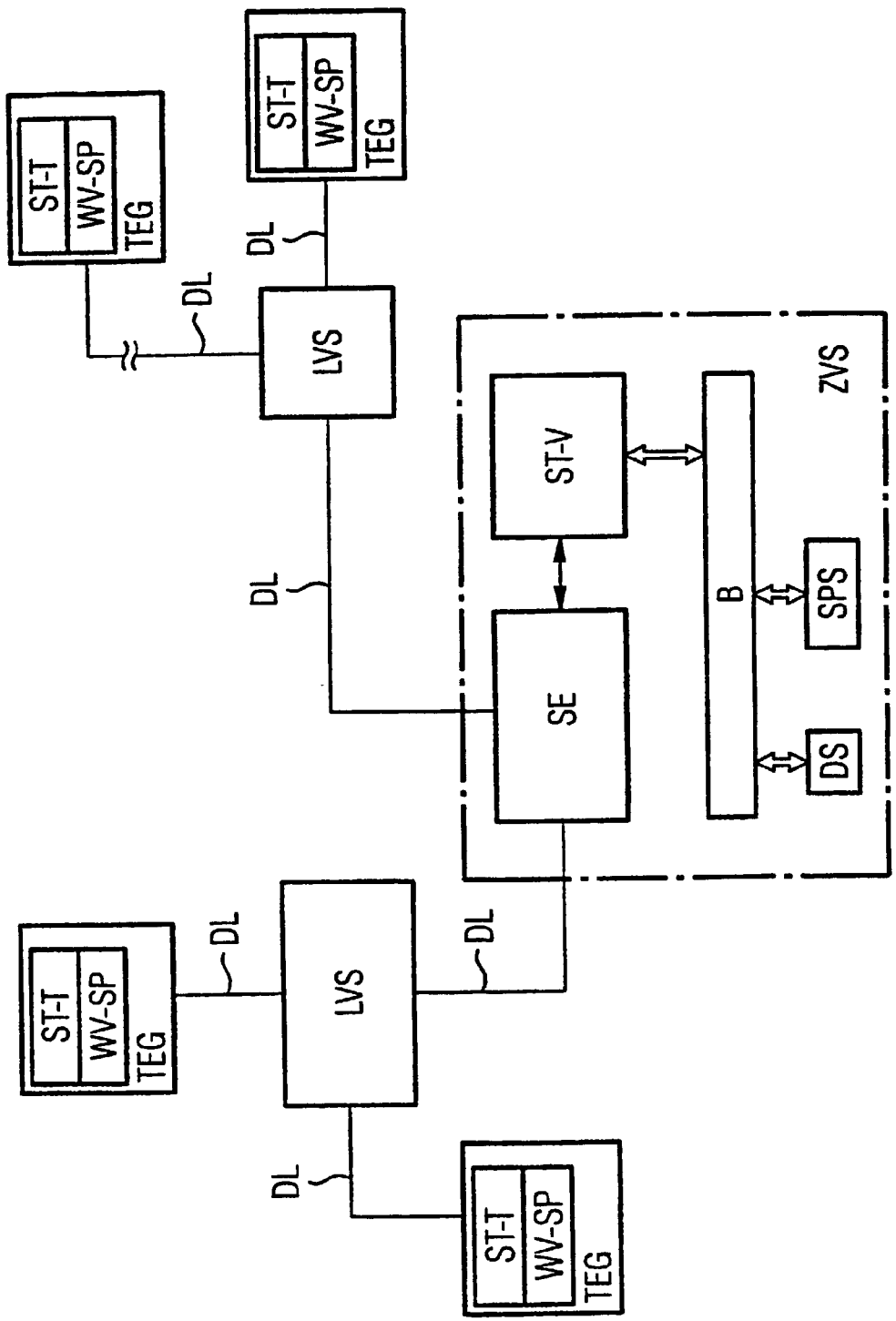

METHOD FOR GENERATING A DIALING DIRECTORY IN A NETWORK TERMINAL AND COMMUNICATIONS NETWORK FOR SUCH A METHOD

CROSS REFERENCE TO RELATED APPLICATIONS

This application is based on and hereby claims priority to PCT Application No. PCT/DE00/03918 filed on Nov. 9, 2000 and German Application No. 199 56 831.6 filed on Nov. 25, 1999, the contents of which are hereby incorporated by reference.

BACKGROUND OF THE INVENTION

The present invention relates to a method for generating a dialing directory in a dialing directory memory of a first network terminal which, by outputting connection data in a network, can set up a connection to a second network terminal which is connected to the network. The invention also relates to a communications network for executing such a method.

Network terminals in the sense of the invention are all devices which are connected to a network and which, by dialing, can set up a connection to a further terminal connected to the network. Dialing in the sense of the invention is the outputting of connection data in the network with which a connection is set up to a further network terminal.

The most customary network terminals in the sense of the invention are telephone terminals. When dialing is performed on a telephone terminal, the connection data is output into the telephone network in encoded form as a pulse signal or frequency signal in order to set up the desired connection. In addition to the telephone network there are a multiplicity of further data networks in which a connection is set up by outputting relevant connection data. Such networks are, for example, Datex-P or BTX.

Most customary telephone terminals have a memory in which frequently used numbers can be stored and called using an abbreviated dialing function.

There are also telephone terminals which have what is referred to as a telephone directory function. The telephone directory function permits a number to be stored with the associated name so that the associated number can be dialed by selecting the name. Such a telephone book function facilitates the administration of a large number of telephone numbers. The data which is to be stored with the telephone directory function must be input by the keypad of the telephone terminal.

WO 96/02996 discloses a method for generating a dialing directory in a dialing directory memory of a network terminal in which a telephone number can be read out from a data memory which is independent of the dialing directory memory and can be stored in the dialing directory memory together with an identifier which is to be input by a microphone or a keypad.

EP 0 554 625 A1 discloses a similar method in which, however, there is no provision of a data memory which is independent of the dialing directory memory.

One aspect of the invention is based on the object of providing a method for simply and quickly generating a dialing directory, in particular for a voice recognition device, in a network terminal, in particular a telephone terminal. In addition, the invention is based on the object of providing a communications network which is suitable for the method according to one aspect of the invention.

SUMMARY OF THE INVENTION

The method according to the invention is used to generate a dialing directory in a dialing directory memory of a first network terminal. The first network terminal can, by outputting connection data in a network, set up a connection to a second network terminal connected to the network. The method comprises the following steps:

reading out of an identifier assigned to the connection data from a data memory which is independent of the dialing directory memory and in which the identifier is stored, and storage of the connection data together with the identifier in the dialing directory memory of the first network terminal.

The identifier is stored as phonetic script in the dialing directory memory so that a specific telephone number can be dialed in the corresponding telephone terminal with a simple voice recognition device merely by speaking the corresponding identifier. The voice recognition device must then merely determine which identifier stored in phonetic script best matches the spoken acoustic signal. It is expedient to restrict the vocabulary during the dialing operation to the identifiers stored in the dialing directory memory, as the assignment is then relatively easy in comparison with other voice recognition operations in which a significantly larger vocabulary has to be evaluated. The identifier is also stored as phonetic script in the data memory.

According to an embodiment of the invention, the data which is stored in a connection data memory of the network terminal is used for reading out from the data memory or for storage in the dialing directory memory. Such a connection data memory is, for example, a redialing memory of a telephone device or fax device. In the case of digital networks, for example ISDN, when a connection is set up the connection data (=telephone number) is transmitted and stored in a connection data memory. The corresponding identifier can be determined by reference to the stored connection data and stored in the dialing directory memory.

The data memory can be arranged at a central location of the network, a multiplicity of connection data and identifiers being stored in the form of a database in the network. When the data stored in it are read out, a connection is set up between the network terminal in whose dialing directory memory the data is to be stored and the data memory via the network, and the corresponding data is transmitted to the network terminal and input into its dialing directory memory via the connection.

However, the data memory can also comprise a multiplicity of data memory elements which are arranged, for example, in the respective network terminals and out of which, when a connection is set up, the data stored therein is read out and transmitted to the respective communications party. The transmitted data can be input into the dialing directory memory on request by a user.

BRIEF DESCRIPTION OF THE DRAWINGS

These and other objects and advantages of the present invention will become more apparent and more readily appreciated from the following description of the preferred embodiments, taken in conjunction with the accompanying drawing of which:

A network according to one embodiment of the invention is illustrated in the drawing.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The single FIGURE shows a telephone network with a central switching office ZVS, a plurality of local switching offices LVS, which are each connected to the central switching office via data lines DL, and telephone terminals TEG which are each connected to the local switching offices LVS via further data lines DL.

The telephone terminals TEG have a dialing directory memory WV-SP in which frequently dialed telephone numbers are stored together with the name of the corresponding telephone subscriber, and a control unit ST-T which controls operations at the telephone terminal TEG. In addition to the name, further information relating to the telephone subscriber, for example, address, profession or the like can also be stored in the dialing directory memory.

The telephone numbers stored in the dialing directory memory can, as with the known telephone directory function, be selected by selecting the name and be dialed in order to set up a telephone connection.

The central switching office ZVS has a switching unit SE which switches the individual telephone lines or channels leading to the central switching station and thus sets up or releases corresponding telephone connections. The switching unit SE is actuated by a control unit ST-V. The control unit is connected to an internal BUS B to which a data memory DS and a voice recognition system SPS are connected.

The telephone network shown in the FIGURE is a digitally operating telephone network, i.e. the signals transmitted via the data line are digitized and the central switching office is embodied as a digital processor system. The audio/digital conversion is carried out in the individual telephone terminals.

If a user wishes to insert a new entry into the dialing directory memory of his telephone terminal, he outputs a predetermined entry signal at his telephone terminal, which entry signal is conducted via the telephone lines DL and the local switching offices LVS to the central switching office ZVS where it is recognized by the control unit ST-V.

After the entry signal, the control unit ST-V waits for a voice input by the user. The user speaks the name and/or the address which form the identifier for a specific telephone number. This voice signal is digitized at the telephone terminal and conducted to the central switching office where the control unit ST-V transfers onward the voice signal to the voice recognition system SPS. The voice recognition system SPS converts the voice signal into text. Text signifies a character code which can be processed by machine, for example ASCII. However, it is also possible for the identifier which is spoken by the user to be converted as text in the form of a phonetic script and further processed as phonetic script.

By reference to the text determined by the voice recognition system SPS the control unit ST-V reads the relevant telephone numbers and identifiers out of the data memory DS in which a database with telephone numbers and associated identifiers is stored, and transmits the relevant telephone numbers and identifiers to the telephone terminal from which the entry signal was output. The control unit ST-V of the central switching office functions here as a reading device of the data memory DS.

At the telephone terminal, the received data is automatically stored in the dialing directory memory by the control unit ST-T. The control unit ST-T thus functions as a memory device for storing the identifier in the dialing directory memory.

Entry signal output can be triggered by a predetermined pushbutton key combination on the telephone, a special pushbutton key being preferably provided for this which when activated triggers the entry signal.

In the method described above for making a new entry in the dialing directory memory, all the user has to do is activate a simple, and always identical pushbutton key combination or even only a single pushbutton key. This significantly simplifies the handling when a new entry is made in the dialing directory memory. This method is suitable in particular for telephone terminals of a small keypad, for example for mobile telephone terminals.

The identifier is stored as a phonetic script in the dialing directory memory WV-SP, so that a specific telephone number can be dialed with a simple voice recognition device in the corresponding telephone terminal merely by speaking the corresponding identifier. The voice recognition device must then merely determine which identifier stored in phonetic script best matches the spoken acoustic signal. It is expedient to restrict the spoken vocabulary during the dialing operation to the identifiers stored in the dialing directory memory WV-SP, because the assignment can then be made relatively easily in comparison to other voice recognition operations in which a significantly larger vocabulary has to be evaluated. The identifier is also stored as phonetic script in the data memory DS.

In a first modified embodiment, use is made of the redialing memory present in many telephone terminals. If the user of the telephone terminal triggers the entry signal in the way described above, the entry signal is transmitted together with the telephone number stored in the redialing memory to the central switching office where the control unit reads out the associated identifier from the data memory by reference to the transmitted telephone number and transmits it to the telephone terminal which outputs the entry signal.

The telephone number and the associated identifier are stored in the dialing directory memory at the telephone terminal.

In this modified method, by triggering the entry signal at a telephone terminal the number which was last dialed at this telephone terminal can be stored together with the corresponding identifier in the dialing directory memory.

In digital telephone networks, for example ISDN, it is customary that when a telephone connection is set up the telephone number of the telephone terminal from which the connection has been dialed is transmitted to the other telephone terminal to which it is connected. As a result, the telephone number of the dialing party is also available at the dialed telephone terminal.

In a second modified method, the function of transmitting the telephone number when dialing can be used in such a way that this telephone number is stored in a connection data memory at the telephone terminal if this terminal is dialed. If another telephone terminal is dialed at this telephone terminal, the connection data memory serves as a redialing memory, i.e. the dialed telephone number is stored in the connection data memory. When the entry signal is triggered, the telephone number stored in the connection data memory is transmitted to the central switching office where the control unit reads the associated identifier out of the data memory by reference to the transmitted telephone number and transmits it to the telephone terminal which outputs the entry signal.

In this embodiment, by triggering the entry signal at a telephone terminal it is possible to store the number of the last connection in the dialing directory memory irrespective of whether the number has been dialed or selected at the telephone terminal.

In a third modified embodiment, a function is used with which, whenever a telephone connection is set up the telephone number and the corresponding identifier are transmitted to the connected telephone terminal. The telephone number and the identifier of the other party to the call is thus available at each telephone terminal. This data is buffered in a data memory provided at the telephone terminal. If a user of a telephone terminal would like to store the telephone number and the corresponding identifier in the dialing directory memory, he triggers the corresponding entry signal, as a result of which the data from the data memory is transmitted into the dialing directory memory. This is the technically most simple and elegant solution. However, it requires the function of automatic transmission of the telephone number and of the identifier.

The invention has been explained above in more detail with reference to the exemplary embodiments. However, the invention is not restricted to these exemplary embodiments. The invention is, for example, not restricted to telephone networks but is instead suitable for all communications networks in which two network terminals can enter into a paired connection by transmitting connection data.

Within the above framework it is also possible for the user to input the connection data manually in order to read out the identifier.

It is also possible that when a voice recognition system is used, it is arranged in the telephone terminal. With such an embodiment the identifier may be stored in phonetic script in the dialing directory. As a result, when there is a renewed call of the telephone number assigned to the identifier, the user must merely speak the identifier which is recognized as such by the voice recognition system. The corresponding telephone number is assigned to the identifier by reference to the dialing directory and is then either automatically dialed or its identifier is displayed to the user for checking purposes, after which the user can then appropriately trigger the dialing operation.

When an identifier is input in spoken form the vocabulary on which the voice recognition is based is restricted solely to the identifiers stored in the dialing directory. As a result, the vocabulary which is to be evaluated by the voice recognition system is very small, which significantly simplifies the voice recognition and correspondingly increases its reliability.

The database which contains the connection data and the identifiers can also be provided in the respective network terminal, for example in the form of an electronically readable data carrier.

The invention has been described in detail with particular reference to preferred embodiments thereof and examples, but it will be understood that variations and modifications can be effected within the spirit and scope of the invention.

The invention claimed is:

1. A method for generating a dialing directory in a dialing directory memory of a first network terminal, so that the first network terminal can use dialing directory data to set up a connection to a second network terminal, comprising:
   whenever a connection is set up between the first and second network terminals, transmitting both connection data for the connection and a connection data identifier associated with the second network terminal, from the second network terminal to the first network terminal;
   reading out the connection data identifier assigned to the connection data from a data memory which is independent of the dialing directory memory, the data memory storing the connection data identifier in phonetic script; and
   upon a request by a user of the first network terminal, storing the connection data together with the connection data identifier in the dialing directory memory of the first network terminal, the connection data identifier being stored in phonetic script in the dialing directory memory.

2. The method as claimed in claim 1, wherein a conversion of spoken connection data into text takes place in the first network terminal.

3. The method as claimed in claim 1, wherein a conversion of spoken connection data into text takes place in a voice recognition device associated with the data memory.

4. The method as claimed in claim 1, wherein a multiplicity of connection data items and connection data identifiers are stored in the form of a database in the data memory.

5. The method as claimed in claim 4, wherein the data memory is arranged at a location which is independent of the first network terminal, and in order to read the database, a connection is set up from the first network terminal to the data memory.

6. The method as claimed in claim 1, wherein
   the first network terminal has a data memory element to store connection data items and associated connection data identifiers, and
   when the connection data and the associated connection data identifier are received from the second network terminal, the connection data and the associated connection data identifier are stored in the data memory of the first network terminal.

7. The method as claimed in claim 1, wherein
   the first network terminal is connected to a device for reading a data carrier, and
   the data carrier contains connection data items and associated connection data identifiers,
   the connection data stored in the first network terminal is read from the data carrier, and
   the data carrier is located in the device for reading.

8. The method as claimed in claim 1, wherein
   telephone terminals are used as the first and second network terminals, and
   the connection data is telephone numbers and the connection data identifiers are names associated with the respective telephone number.

9. The method as claimed in claim 3, wherein a multiplicity of connection data items and connection data identifiers are stored in the form of a database in the data memory.

10. The method as claimed in claim 9, wherein the data memory is arranged at a location which is independent of the first network terminal, and in order to read the database, a connection is set up from the first network terminal to the data memory.

11. The method as claimed in claim 10, wherein
   the first network terminal is connected to a device for reading a data carrier, and
   the data carrier contains connection data items and associated connection data identifiers,
   the connection data stored in the first network terminal is read from the data carrier, and
   the data carrier is located in the device for reading.

12. The method as claimed in claim 11, wherein
   telephone terminals are used as the first and second network terminals, and
   the connection data is telephone numbers and the connection data identifiers are names associated with the respective telephone number.

13. A dialing directory method to operate a dialing directory memory of a first network terminal initiating a connection to a second network terminal, comprising:
- storing connection data identifiers and associated connection data in a data memory which is independent of the dialing directory memory, the connection data identifiers being stored in phonetic script;
- for a new entry having connection data, reading the associated connection data identifier from the data memory; and
- storing in the dialing directory memory, both the connection data and the connection data identifier read from the data memory, the connection data identifier being stored in phonetic script, wherein
- whenever a connection is set up between the first network terminal and the second network terminal, both connection data for the connection and an identifier associated with the second network terminal are transmitted from the second network terminal to the first network terminal, and
- the connection data and the identifier transmitted by the second network terminal are saved into the dialing directory memory of the first network terminal upon a request by a user of the first network terminal.

14. A method according to claim 13, further comprising:
- receiving as a voice command, a voice identifier from the user;
- matching the voice identifier with connection data stored in the dialing directory memory; and
- transmitting the connection data to establish a connection with a second network terminal.

15. A communication network establishing a connection between an initiating terminal and a receiving terminal, comprising:
- a first memory provided in at least the initiating terminal and storing, upon request by a user of the initiating terminal, initiating connection data with a connection data identifier in phonetic script associated with the receiving terminal and transmitted by the receiving terminal when the connection is established between the initiated and receiving terminals;
- a second memory, separate from said first memory, storing connection data identifiers in phonetic script and associated connection data for each of the connection data identifiers;
- a reading device reading one of the connection data identifiers from said second memory; and
- an access device, coupled to said first memory, storing in said first memory one of the connection data identifiers and the associated connection data corresponding thereto as read from the second data memory.

16. The communication network according to claim 15,
- wherein said second memory is distributed over said communication network, and
- said communication network further comprises element terminals respectively including second memory elements forming said second memory, each second memory element storing an element identifier in phonetic script and associated element connection data corresponding to said element terminal containing the second memory element.

17. The communication network according to claim 15, further comprising a speech recognition system in at least the initiating terminal.

18. The communication network according to claim 15, wherein said second memory is separate from the initiating and receiving terminals and contains a database storing the connection data identifiers and the associated connection data.

19. The communication network according to claim 15, further comprising a common activation device activating both said reading device and said access device.

20. The communication network according to claim 15,
- further comprising a redial memory in at least the initiating terminal, and
- wherein said reading device reads from said second memory a redial identifier in phonetic script based on redial connection data from the redial memory.

21. The communication network according to claim 20, further comprising a speech recognition system in at least the initiating terminal.

22. The communication network according to claim 20, wherein said second memory is separate from the initiating and receiving terminals and stores the connection data identifiers and the associated connection data as a database.

23. The communication network according to claim 20, further comprising a common activation device activating both said reading device and said access device.

* * * * *